Sept. 29, 1970      J. LEIMERT      3,530,642
APPARATUS FOR SEALING FILM
Original Filed Feb. 10, 1967
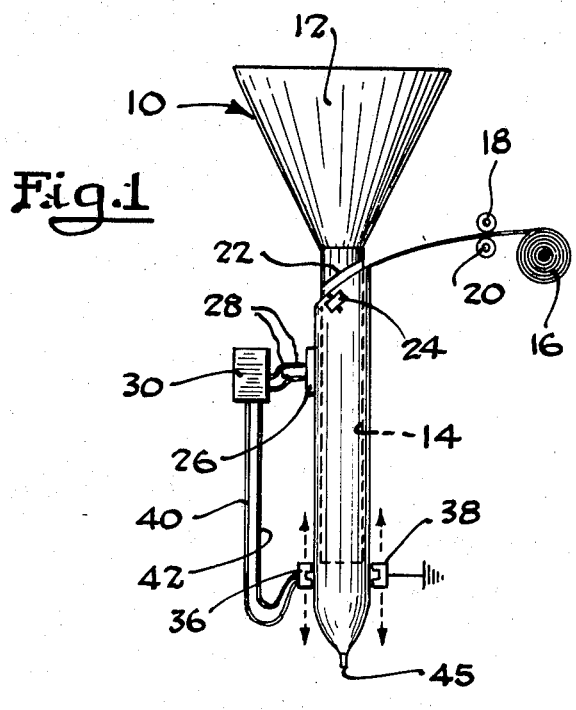
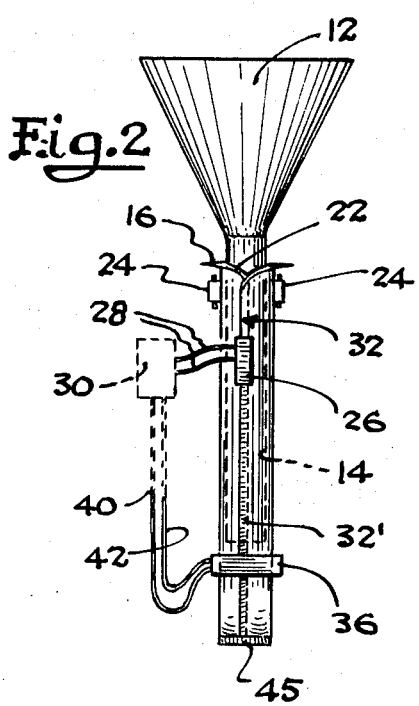
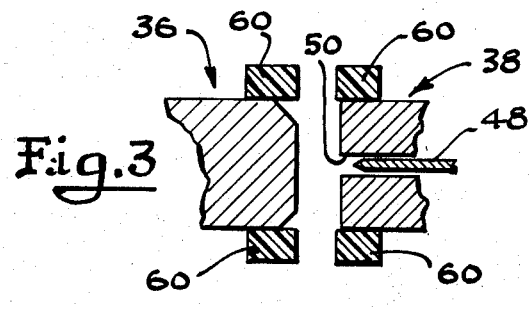
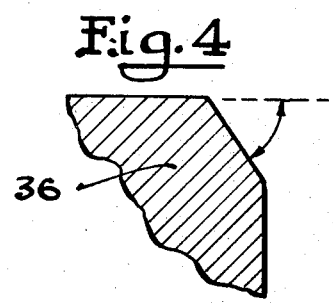
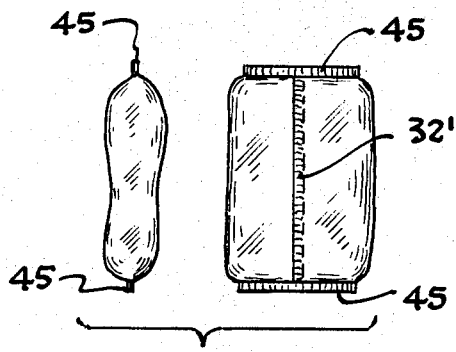
Inventor
John Leimert
By Burmeister & Kulie
Attorneys

# United States Patent Office 3,530,642
Patented Sept. 29, 1970

3,530,642
APPARATUS FOR SEALING FILM
John Leimert, 2000 Center St., Northbrook, Ill. 60062
Continuation of application Ser. No. 615,171, Feb. 10, 1967. This application May 15, 1968, Ser. No. 729,315
Int. Cl. B65b 51/22
U.S. Cl. 53—180     5 Claims

ABSTRACT OF THE DISCLOSURE

An apparatus for sealing plastic film into an enclosed form with high frequency electrical energy, the film first being formed into a closed shape and continuously sealed in this shape, said apparatus contemplating the sealing of film such as polyvinyl chloride rapidly and without interruption in the seal.

---

This application is a continuation of application Ser. No. 615,171, now abandoned, filed Feb. 10, 1967

The present invention relates to an improved apparatus for sealing plastic film and more particularly it relates to an improved apparatus for use in sealing polyvinyl chloride film, or materials having similar characteristics in terms meaningful to the present development, wherein the film first is formed into the desired shape and then sealed with high frequency electrical energy to define a complete closure which may be filled with solid or liquid materials prior to final sealing.

Many devices have been developed in the past for use in sealing plastic film into predetermined shapes which may be used for containers for liquid or solid materials. Packaging of solids by this method normally will not involve serious problems during the sealing operation after filling the container. Similarly, the packaging of many liquids is not difficult and sealing may be realized with the container already filled.

Problems do arise, however, when packaging materials where the lateral dimension of the film is less than the lateral dimension of the sealing jaws. In these instances, which occur frequently, the exposed portions of the jaws may pass electrical energy therebetween by way of electrical arc discharges that will seriously prejudice the sealing operation. My method and apparatus will avoid or minimize this problem so that exposed areas on the sealing jaws need not be a serious concern.

Some of the earlier methods and apparatus employed in sealing plastic film, and particularly PVC, or polyvinyl chloride, employed gripping or sealing means which were relatively heavily insulated to minimize or eliminate the arcing problems. I have found, however, that the use of insulating materials on the sealing means results in a requirement for greater power as compared to the use of gripping or sealing means without insulating covering to seal the same thickness material. I also have found that it is very difficult to realize uniform gripping pressure with the sealing means when some form of insulating covering is used on the sealing jaws. Accordingly, the materials to be sealed are gripped with differing pressure across the area to be sealed and the sealing means may be in a variably spaced relation across the area to be sealed with attendant variation in electrical energy transfer across the area.

In accordance with the present invention I provide an improved method and apparatus for use in sealing polyvinyl chloride or other plastic film material wherein the gripping or sealing means used are not covered with an insulating material.

The method and apparatus disclosed herein provide means for uniformly gripping the material across the entire area to be sealed whereby a uniform spacing is provided between the gripping elements thereby avoiding an operating condition where concentration of electrical energy transfer might occur.

In sealing with the method and apparatus of the present invention, a plastic film first is formed into the desired shape and then joined by the use of high frequency electrical energy while the film is continuously moving in a path through the apparatus.

It is, accordingly, a general object of the present invention to provide an improved method and apparatus for forming and sealing a plastic film into a sealed container.

Another object of the present invention resides in the provision of an improved method for sealing plastic film to define a sealed container which avoids perforations in the film during the sealing operation.

A further object of the present invention resides in the provision of an improved method for sealing plastic film where the areas to be sealed are uniformly gripped and subjected to substantially uniform energy levels during sealing.

An additional object of the present invention resides in the provision of an improved apparatus for sealing plastic film wherein the gripping means or sealing jaws used in making the seals do not have an insulating covering.

Another object of the present invention resides in the provision of an improved apparatus for sealing plastic film wherein the jaws used to transfer energy to the film are designed so that a concentration of energy will not occur in any portion of the sealing area thereby reducing the probability of interruptions in the sealed area.

An additional object of the present invention resides in the provision of an improved method and apparatus for sealing plastic film that is easy to perform, that is readily reproduceable, that is economical to use and which includes apparatus that is economical to use, that is durable in use and that is relatively easy to maintain.

The novel features which are believed to be characteristic of the invention are set forth with particularity in the appended claims. The invention itself, however, together with further objects and advantages thereof, will best be understood by reference to the following description taken in connection with the accompanying drawings, in which:

FIG. 1 is a side elevation of one form of apparatus utilizing the present invention, the drawing specifically illustrating a tubular forming and sealing means;

FIG. 2 is another elevation view of the apparatus of FIG. 1 viewed from the rear of the apparatus;

FIG. 3 is an enlarged, fragmentary view of a gripping and sealing means of the apparatus of FIG. 1, showing one form of the invention where severing means is associated with the sealing means of the apparatus;

FIG. 4 is a fragmentary, enlarged view of one element of the gripping and sealing means of the apparatus illustrating the configuration of the element to reduce the concentration of the electrical energy across the sealing means during use;

FIG. 5 of the drawings is a fragmentary view of a severing means which may be utilized in the form of the invention set forth in the view of FIG. 3; and FIG. 6 is a schematic representation of one form of a sealed container which may be prepared utilizing the method and apparatus of the present invention.

It should be observed that certain plastic materials, such as polyvinyl chloride, can be modified to a viscous liquid state by passing high electrical energy through the material. While the material is in this state it may be welded to similar material by the application of pressure to the film for a predetermined period of time. The time variable is a fixed function of the level of energy and of the degree of pressure applied to the material being welded.

Some of the variables involved in sealing or welding plastic film are:

(1) The quantity or level of electrical energy applied to the material to be joined;

(2) The time during which the energy is applied;

(3) The amount of pressure used during the joining operation;

(4) The time of pressure application;

(5) The distance between the sealing means which grip and pass energy through the material being sealed.

It should be noted that an increase either in the energy or pressure variable will effect an attendant decrease in the time this energy or pressure must be applied. Thus, these functions are inversely related as would be expected.

The positioning of the sealing and gripping means is critical in that arcing problem is a very important function of this variable. The energy level, of course, also is related to the arcing problem. Arcing will occur, in one condition, when one sealing element is sufficiently close to the other so that the energy level being used will be sufficient to develop an ionized path through the air gap between the elements and thereby result in a quick discharge of energy from one element to the other which is at a lower potential. If this arcing occurs through the material a perforation will occur and the container will be defective.

It should be observed that the contents of the container being sealed can affect the arcing condition by reducing the effective impedance in the system. Thus, while the particular operating condition may properly seal containers when empty, arcing may occur if the seal is made through a fluid having a different conductivity characteristic and different ionization characteristic than air. Arcing will be highly likely for example, if the seal is being made through ethylene glycol rather than through air or water.

In the method of sealing disclosed herein, the cold or ground element of the sealing means may be of any convenient size and have a configuration which will accommodate the mating element of the sealing means. The ground element must be sufficiently rigid to support the pressure exerted against it during the sealing operation.

The hot, or electrically conducting element of the sealing means may be of any suitable shape and size. The hot element, however, should satisfy the following requirements to provide the satisfactory weld when using the apparatus disclosed herein: (a) the surface of the hot element should exert substantially equal pressure across the material between the hot and ground elements (this may be measured by gauging the hot element against the ground element to determine whether uniform mating and pressure application will occur when material is inserted therebetween); (b) when the sealing action is being performed the distance between any laterally related points on the hot and ground elements of the sealing means should be substantially equal to the distance between any other so related points between the elements.

All of the points and distances noted above should be substantially equal with the variation preferably not exceeding about 1 mil. The distance between hot and ground elements during use, of course, is variable. However, it should be sufficient to prevent arcing and is a function of the impedance of the film being sealed and the level of energy used in the sealing operation.

The shape of the hot element is significant in establishing the geometry of the field between the hot and cold elements and it should be such that the concentration of energy along a line on the hot element is minimized and the concentration of energy along the film contact area of the hot element is maximized with a corresponding reduction in the quantity of energy passing through the film and required to seal or weld a given film area—the geometry of the hot element also being critical to minimize the amount of energy passing through the film in areas adjacent to the area to be sealed.

If the plastic film does not extend fully across the hot element of the sealing means, I have found it desirable for optimum performance characteristics to fill the space between the exposed portion of the hot element and ground element with an electrical system having characteristics substantially the same as that of the film being joined between the hot and ground elements. This may be done in several ways. One way would be to insert the material in the exposed areas that will conduct energy but which has physical characteristics of the material being joined except that it will have a different energy level requirement for liquification. Another method would be to inject a stream of ionized gas into the exposed area to define a conductive path for electricity without creating a condition which would give rise to arcing between the hot and ground elements.

The method set forth herein is effective for any commercial film thickness and has been used in sealing film thicknesses down to about 6 mils. When the energy required to seal the film is sufficiently high that it will arc across the air gap between the hot and ground jaws thereby giving rise to a self-defeating condition where because of the arcing and attendant energy dissipation, sealing may not be realized as desired.

The apparatus of the present invention was particularly directed to defining an improved means of radio frequency welding of relatively thin polyvinyl chloride by pressure exerted between the faces of the sealing means. I particularly was interested in sealing PVC bags with radio frequency energy without arcing. The containers or bags may be open on one or both ends or completely closed and contain a product as part of a continuous or discontinuous high speed automatic fill operation.

In development of the apparatus disclosed herein I experimented with sealing means connected to a source of high frequency energy. One of the sealing jaws with which I performed some of the sealing operations was electrically connected by a coaxial cable to a 1000 watt radio frequency generator producing an alternating current through a welding unit of 41 mHz. The other sealing jaw, of course, was connected to ground.

The radio frequency generator which I have used in making seals of the type disclosed herein is provided with a power level control having settings at intervals of 10 from 0 to 100 which may be varied to increase or decrease the voltage available at the surface of the electrode or welding face. This voltage may be varied by the use of this control to a level between approximately 500 volts and 2500 volts for an electrode contact face of 1⅛ square inches. Varying the contact base area of the electrodes, will, of course, result in a variation of the maximum and minimum voltages which may be applied thereacross. For example, an electrode face of 3 square inches, with the apparatus noted above, would result in a minimum voltage of approximately 1250 volts at its high setting.

The jaws which were used in performing the sealing operations on PVC and which I found to be satisfactory for this purpose had a welding face dimension originally defined at 6 inches in width and 3/16 of an inch high. I then modified the welding face by removing a horizontal triangular segment at the top and bottom with approximately a 60 degree included angle between an extension of the vertical face remaining and the angular cut back of the removed section. The welding operation then was performed with the settings on the variable control of the generator from a high setting down to a setting of about 30. Strong continuous welds were defined with any setting between the limits noted above and with a compression of .001 inch on the PVC film (film thickness .008 inch), the resulting distance between the jaws being 0.015 inch. At control settings below 30 arcing did not occur but a weld was not produced because the energy level was not sufficiently high. With control settings between 30 and 100, the high setting, I found that perfect welds were achieved in each instance. This testing, of course, was done with unfilled containers. That is, the welding was done only with the film present between the jaws.

I have found that it is essential to remove a substantial portion of the extremes of the welding face to define a condition which will provide satisfactory welds through PVC. I used different jaw configurations in developing the method and apparatus set forth herein but found that in each instance it was necessary to remove the corners at a substantial portion adjacent the corners of the welding faces to provide a means for successful sealing of the material. I found that even with ethylene glycol within the container being formed, I could achieve a satisfactory weld with PVC in all operating configurations until the space between the exposed faces of the electrodes was reduced down to about .005 inch when some arcing began to occur. Perfect welds were achieved in each instance with regulator settings from 100 down to and including about 80. It should be noted, however, that once the welding units were warmed by prior use, and with suitable pressure, I was able to repeatedly obtain welds through the PVC with a power "on" time of about ¼ to ½ second. I found this to be the case even though the material might not extend completely across the exposed faces of the welding jaws.

The problem has frequently occurred in the past with prior devices when the film being sealed did not completely cover the exposed face of the welding jaws. It was common for arcing to occur between the uncovered portions of the jaws even though welds might not be achieved in the film between the jaws. With the method and apparatus disclosed herein I have found that arcing does not occur even in the unexposed areas of the jaws.

It should be observed that there are, of course, certain variables in the welding of PVC, as in any other welding operation. Some of the variables which I have noted are:

(1) The film thickness. That is, the voltage requirement is related to the film thickness.

(2) PVC films contain plasticizers and other additives. As these materials vary in quantity, the characteristics of the film may change and, accordingly, the voltage required to heat them to welding temperature may change.

(3) The dielectric characteristics of the PVC film may change with the change in formulation of the film.

(4) PVC films may be made soft or hard and these changes will affect the amount of compression resulting from welding at a given voltage and pressure. An increase in compression may shorten the distance between the electrode faces at the moment of the welding.

I have found that variations in the effective geometry of the welding jaws may be realized without departing from the substance of the apparatus set forth herein and while still achieving satisfactory welds with PVC. For example, the amount of material removed in the horizontal sections at the upper and lower portions of the welding faces may vary substantially. The important consideration, however, is not the specific angle defined between the vertical of the welding face and the taper defined by the removed portion of the jaw but rather the remaining area of welding surface, the amount of pressure used, and the voltage at the welding surface which is utilized to make the weld.

One of the specific welding jaw configurations which I used had an overall face dimension of about 6" by 1". I removed a substantial portion of the upper and lower lateral corner sections of the jaw face by cutting back from the face at an angle of about 45° so that the length of the inclined surface from the jaw face to the upper or lower wall was about ⅜".

In one specific illustration of the method of the present invention I first formed a flat sheet of film into a tubular shape, open at both ends. The longitudinal edges of the sheet were placed in overlapping relation and the overlapped portion of the film sealed by passing high frequency electrical energy therethrough while maintaining pressure on the overlapped portion of the film. The time of application of the energy preferably should be about ¼ to 1 second. The energy level and pressure required may be varied for each film and film thickness to achieve the desired result. For example, with the high frequency generator noted hereinabove I achieved satisfactory welds at a setting of about 80 with a sealing jaw dimension of 6" by ³⁄₁₆".

A portion of the tubular film shape then is secured laterally between sealing elements and a high frequency energy is applied to the gripped portion of the film to seal this area. The closed end tubular section then may be filled with any material desired and the tubular section then completely closed by sealing the tube section at an area spaced from the first seal and passing high frequency electrical energy through the gripped portion for approximately ¼ to 1 second to define the second seal and thereby complete the container. The sealed portions are then cut to remove the container from the tube section.

The apparatus generally discussed above is commonly known as a form and fill device wherein the tubular shape of the container is defined on a round fill pipe. The apparatus is generally indicated at 10 in FIG. 1. It includes a supply hopper 12 in which the materials to be packaged may be stored and from which they are fed during the packaging operation. The hopper 12 is directly connected to the fill pipe 14 of the apparatus.

It should be observed that while a specific definition of the method and apparatus set forth herein is disclosed in conjunction with a form and fill machine, any other suitable processing apparatus may be employed equally well with the apparatus discolsed herein, as noted above in a specific discussion of the sealing technique which I have developed.

A supply roll of PVC 16 is supported on a suitable apparatus which may be mounted on a support frame. The film 16 is fed between rollers 18 and 20 and carried to the fill pipe 14. The rolls 18 and 20 control the feed of film to the pipe 14 and assist in maintaining tension on the film to assure proper formation of the tubular configuration about the fill pipe 14.

A collar 22 is provided on the fill pipe 14 near the upper terminal thereof. The film 16 is fed below the collar 22 to the pipe 14. Rollers 24, below collar 22, direct the film closely about the pipe 14 as it passes under the collar to cause it form about the pipe. The film 16 is carried along under the first sealing means 26 which is electrically connected through lines 28 to an energy generator. The film is formed about the pipe 14 with the longitudinal edges overlapped as shown in FIG. 2 at 32. The overlapped edges pass under the sealing means 26 which are brought to pressure engagement with the film to grip it between the means 26 and pipe 14. Energy then is passed through the film while pressure is maintained on the film to weld the ovrelapped edges and define a tubular shape open at both ends. The weld of the edges is illustrated at 32' in FIG. 2.

The first sealing means 26 has a flat sealing surface between the tapered portions of the jaw which surface presses against the film when being sealing and grips it between the sealing means the wall of pipe 14. In this manner, the primary gripping and sealing pressure is between the central axial portion of the sealing surface of the means 26 and a line along the wall of pipe 14. The outboard edges of the sealing means are in spaced relatio to the wall of pipe 14 and the impedance in this air gap is sufficiently high to prevent arcing. In this manner an operative condition is established which will minimze the chance of arcing along an area adjacent the sealed area and will minimize the chance for perforation of the film adjacent the sealed area.

The film is moved down the pipe 14 until it passes over the lower terminal of the pipe and between the elements 36 and 38 of the second sealing means. Elements 36 and 38 then move toward each other to engage the film to grip it. Element 38 is at ground potential while element 36 is connected through leads 40 and 42 to the high frequency electrical energy generator 30.

The elements of the second sealing means are adapted to cycle vertically to accommodate the continuous filling action of the apparatus disclosed herein.

Elements 36 and 38 grip the film 16 transversely of the longitudinal axis of the defined tube as it comes from the pipe 14. Accordingly, the elements 36 and 38 define means for providing end seals for the formed container, as noted below.

The end seals 45 of the container are defined when a high frequency electrical energy is passed through the sealing elements 36 and 38 while they are in pressure engagement with the film 16, as defined in greater detail hereinabove in a general discussion of the method of sealing PVC with the technique of the present invention. While this sealing action is taking place the elements 36 and 38 may continuously be moving vertically downward, as seen in FIGS. 1 and 2, and the container may be filled at the same time through pipe 14 with the fill rate being adjusted to accommodate the downwardly moving container segment. It should be noted, however, that intermittent operation may be realized by first sealing the lower end of the container; filling the container and then sealing the upper end after moving the filled container down to place the upper portion thereof into registration with the second sealing means. The latter method, however, is a slower operation and may not be preferred.

The first sealing means 26, of the specific apparatus noted herein, may be cycled at about 1 second intervals so that a continuous sealing action may be realized on the back seal 32' as well as on the end seals 45.

When the container segment is filled, the sealing elements 36 and 38 will be at their uppermost position and moving into engagement with the film 16 to grip the film. As the film is gripped the segments 36 and 38 again begin moving down while the tubular section thereabout is being filled with material. Electrical energy is passed through the hot element 36 to the ground element 38 to seal the film between the elements while said elements are moving down with the film. The energy is applied for about ¼ to 1 second to define a complete seal. It should be noted that the sealing operation for PVC may be accomplished much more rapidly than with devices known to exist in the prior art. The gripper and sealing elements will then have finished the sealing operation and will be in condition for removal from the film. If the sealed film area 45 is to be severed at a later stage of processing, the sealed elements 36 and 38 may be removed at this point and recycled to the upper most position for the next sealing operation in the continuous operation of the apparatus. However, if synchronization of multiple processing stages is desired then the filled and sealed container may be severed from the remainder of the film material while the sealed area is still gripped between the elements 36 and 38. To accommodate this action, in one form of the invention, a knife or other severing element 48 may be mounted within or associated with the sealing elements. In the specific embodiment shown here it is associated with the ground element 38 of the sealing means.

The element 48 is mounted within a recess 50 in the element 38 so that it will not interfere with the sealing action of the elements. The knife 48 may be affixed to the rod 52 of an air cylinder 54. When the seal 45 is completely defined, electrical energy to the element 36 is terminated and the air cylinder 54 is actuated to push the knife blade along the recess 50. It can readily be seen that the blade 48 is provided with a tapered knife edge 56. Accordingly as the knife is moved along the recess 50 the edge 56 will extend beyond the front face of the element 38 and into the film which is gripped between elements 38 and 36 to sever the film 16 at approximately the midpoint of the sealed area.

Each of the elements 36 and 38 is provided with gripper means which may be in the form of plastic or rubber segments 60 which are secured in associated relation to the elements 36 and 38. The flexible gripper segments 60 are mounted on the elements 36 and 38 such that a portion of each extends beyond the mating faces of said elements. Accordingly, the elements 60 will be the first to frictionally engage the film 16 during movement of the elements toward each other. Segments 60, however, are sufficiently flexible to collapse slightly and to permit the elements 36 and 38 to apply pressure to the film 16 across the area to be sealed.

The hot element 36, as noted above, is provided with a preferred geometry on the film contacting face. The outboard lineal edges of the element 36 are removed to define a tapered portion remaining. The angle of FIG. 4 is approximately 60 degrees and has been found to be acceptable in limiting energy concentration along this edge (and the opposing edge) thereby reducing any tendency to cause a condition which may result in arcing between the elements 36 and 38. It should be noted, however, that other tapers may be employed which will work equally well. I have constructed sealing jaws with an included angle between the vertical plane and the remaining tapered surface of 40 degrees to slightly in excess of 60 degrees.

While I have shown and described a specific embodiment of the present invention it will, of course, be understood that other modifications and changes in the method specifically set forth herein may be used without departing from the true spirit and scope of this invention. I therefor intend by the appended claims to cover all such modifications and changes as fall within their true spirit and scope.

What I claim as new and desire to secure by Letters Patent of the United States is:

1. An apparatus for sealing plastic film into an enclosed form with high frequency electrical energy comprising, in combination:
   a support member for the apparatus;
   a source of high frequency electrical energy operatively associated with said apparatus and adapted to provide energy to seal said film;
   a film supply on said support member for storage and feeding of film during use of the apparatus;
   a path of travel defined through the apparatus along which the film moves;
   sealing means with exposed film contact surfaces on said apparatus operatively associated with said high frequency electrical energy source, said sealing means defined by spaced apart jaw elements each in spaced relation to the path of travel of the film as the film moves through the apparatus with said film moving between said elements, said sealing means intermittently engaging the film on either side thereof at predetermined spaced intervals along the film, said means adapted for limited path of travel movement during use of the apparatus so that its sealing function continuously occurs while movement of the film continues through the path of travel in the apparatus, said sealing means adapted to pressure engage the film at said spaced intervals, the law elements of the sealing means each having a tapered portion along the outboard lateral edges to prevent concentrations of electrical energy to avoid perforating the film during sealing and to avoid arcing along the exposed portions of the jaw.

2. The apparatus of claim 1 wherein severing means is provided to sever the sealed film at said spaced intervals where the film is sealed, said severing means cutting the film wholly within the sealed portion at each sealed interval to define separate film enclosures.

3. The apparatus of claim 2 wherein one jaw of the second sealing means is split to include the severing means therewithin.

4. The apparatus of claim 1 wherein the jaws of the (second) sealing means are uniformly spaced apart during the sealing operation.

5. An apparatus for sealing a flat sheet of plastic film into an enclosed form with high frequency electrical energy comprising:

a support member for the apparatus;

a supply spool on said support for storing and continuously feeding the flat plastic film during use;

a hollow tubular enclosure extending partially along the path of travel of the film through the apparatus and defining means about which the flat sheet of film is tightly wrapped and formed into the desired configuration, the opposite edge of said sheet being in overlapped relation along the tubular enclosure;

first sealing means connected to said high frequency electrical energy source and associated with said tubular enclosure, said first means adapted to pressure engage the film as it passes along said enclosure to seal with high frequency electrical energy the overlapping portions of the film along said tubular enclosure;

second sealing means connected to said high frequency electrical energy source and defined by spaced apart jaw elements below said tubular enclosure and being in the path of travel of the film as it moves through the apparatus, said film adapted to move between said jaws, said second sealing means being arranged to define a seal across the film normal to the longitudinal axis of the film in the apparatus with said high frequency electrical energy, said second sealing means adapted for limited movement during use of the apparatus so that its sealing function may continuously occur as movement of the film continues through the path of travel in the apparatus, said second sealing means adapted to pressure engage the film at spaced intervals therealong to define a completely enclosed member sealed at both ends; the jaws of the second sealing means each defining a tapered portion along the outboard lateral edges to prevent concentrations of electrical energy to avoid perforating the film during sealing and to avoid arcing along the exposed portions of the jaw; and severing means to sever the sealed film at each spaced apart sealed interval along the film and wholly within the sealed portion at each said interval to define separate film enclosures.

References Cited

UNITED STATES PATENTS

| 2,741,296 | 4/1956 | Collins | 156—380 |
| 2,966,021 | 12/1960 | Lane et al. | 53—182 |
| 3,001,348 | 9/1961 | Rado | 53—373 X |
| 3,188,781 | 6/1965 | Aquarius et al. | 53—180 |
| 3,234,069 | 2/1966 | Szasz | 156—380 |

THERON E. CONDON, Primary Examiner

E. F. DESMOND, Assistant Examiner

U.S. Cl. X.R.

53—373; 156—380